US 8,260,505 B2

(12) United States Patent  (10) Patent No.: US 8,260,505 B2
Peeters et al.  (45) Date of Patent: Sep. 4, 2012

(54) APPARATUS AND METHOD FOR DETERMINING ROLL ANGLE OF A MOTORCYCLE

(75) Inventors: Felix Godfried Peter Peeters, Eindhoven (NL); Hendrikus Martinus Wilhelmus Goossens, Eindhoven (NL); Hubert Gerard Jean Joseph Amaury Vroomen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 868 days.

(21) Appl. No.: 12/293,295

(22) PCT Filed: Mar. 17, 2007

(86) PCT No.: PCT/IB2007/050912
§ 371 (c)(1), (2), (4) Date: Sep. 17, 2008

(87) PCT Pub. No.: WO2007/107935
PCT Pub. Date: Sep. 27, 2007

(65) Prior Publication Data
US 2009/0103319 A1    Apr. 23, 2009

(30) Foreign Application Priority Data
Mar. 21, 2006    (EP) .................................. 06111476

(51) Int. Cl.
*G01C 21/36*    (2006.01)

(52) U.S. Cl. .......................................... 701/49; 362/466
(58) Field of Classification Search .................... 701/49; 362/466
See application file for complete search history.

(56) References Cited

U.S. PATENT DOCUMENTS

| 4,868,720 A | 9/1989 | Miyauchi et al. |
| 2006/0069506 A1* | 3/2006 | Hanya ............................. 701/220 |
| 2010/0168958 A1* | 7/2010 | Baino ............................... 701/36 |

FOREIGN PATENT DOCUMENTS

| DE | 19817594 A1 | 10/1999 |
| DE | 10350046 A1 | 5/2005 |
| FR | 2844759 A1 | 3/2004 |
| WO | 0201151 A1 | 1/2002 |

* cited by examiner

*Primary Examiner* — Kevin Hurley
(74) *Attorney, Agent, or Firm* — Larry Liberchuk

(57) ABSTRACT

An apparatus for determining roll angle of a motorcycle (1) as when taking a curve or bend in a road. The apparatus includes a first gyro sensor (11) that provides a roll rate signal, a second gyro sensor (12) that provides a yaw rate signal, and a velocity sensor (36). The apparatus is configured to integrate the roll rate signal to obtain a first intermediate roll angle value and to determine a second intermediate roll angle value from the yaw rate and the vehicle velocity. The apparatus combines the two intermediate roll angle values into an output value for the roll angle that can be used by a servo (50) to adjust the orientation of the headlamp so that the beam pattern remains leveled with the horizon when the motorcycle (1) rolls when taking a curve.

9 Claims, 2 Drawing Sheets

APPARATUS AND METHOD FOR DETERMINING ROLL ANGLE OF A MOTORCYCLE

Figure 1:
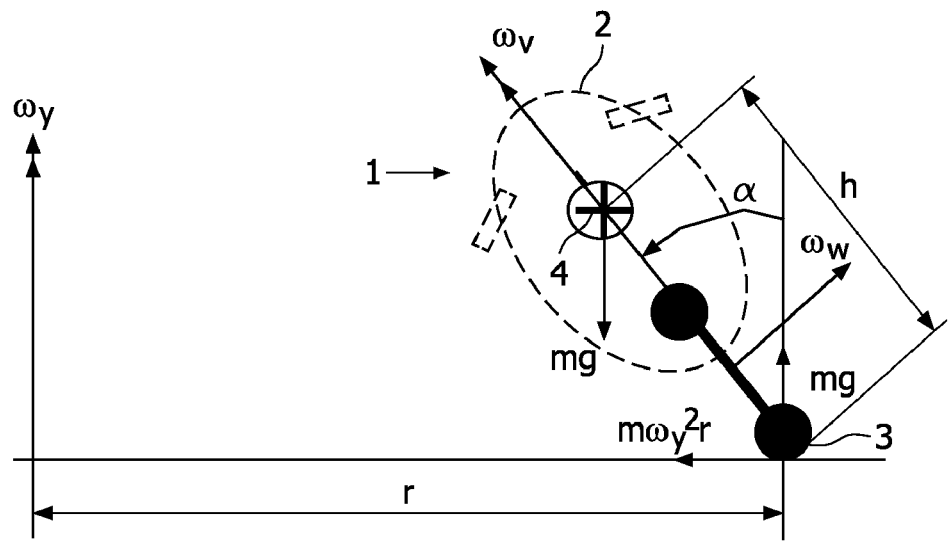

The present invention relates to an apparatus for determining roll angle of a motorcycle as when taking a curve or bend in a road. More specifically, the present invention pertains to an apparatus for use with such motorcycle headlamps for automatically maintaining the pattern of the light beam leveled horizontally in the face of variations in the roll angle of the vehicle with respect to the horizon. Further, the invention relates to software and to a method for determining a roll angle.

Motorcycle headlights have a beam pattern that is shaped in accordance with legal requirements to illuminate the road ahead without blinding opposite traffic. The pattern suits all the requirements when it is aligned with the horizon. However, when the motorcycle rolls as in taking a curve, the range of the light beam on the inner side of the curve is significantly reduced, thus causing a safety risk in that the driver cannot see objects ahead in his path, whilst the light beam on the outer side of curve blinds opposite traffic. These problems have delayed the introduction of Xenon lights in motorcycles, since the high intensity of their light beam requires that blinding of opposite traffic is substantially avoided. Roll angle values can also be used as input for anti lock brake systems, anti skid control systems and stability control systems.

DE 198 17 594 discloses a motorcycle headlight control system that provides roll adjustment as the motorbike travels along a curve. The system includes two gyro sensors: one gyro sensor detecting the roll rate and the other gyro sensor detecting the yaw rate of the motorcycle. The control system for the headlight of the motorcycle includes a mechanism which is able to adjust the rotational orientation the headlight about the lamp axis as the motorcycle travels along. The system uses the signal from the roll rate sensor to control the mechanism for adjusting the rotational orientation the headlight. The yaw rate signal is provided to create a redundant system. A disadvantage of this known system is that extra information for establishing the initial value of the roll angle is required. Further, for accurate results the offset of the sensor and/or the electronics needs to be very low. This sets high demands on the gyro sensor and on the electronics, which will therefore be expensive.

It is an object of the present invention to provide an apparatus for determining roll rate of a motorcycle or similar vehicle that is inexpensive, robust and provides high quality signals, i.e. low or no drift and high bandwidth.

This object is achieved in accordance with claim 1 by providing an apparatus for determining the roll angle $\alpha$ of a motorcycle or like vehicle that may roll when taking a curve, the apparatus comprises a first gyro sensor that produces a signal representing the roll rate of the vehicle, a second gyro sensor that produces a signal representing the yaw rate $\omega_y$ of the vehicle, first means configured to determine a first intermediate value for the roll angle of the vehicle by integrating the measured roll angle velocity, second means configured to determine a second intermediate value for the roll angle of the vehicle from the measured yaw rate $\omega_y$ and the measured vehicle velocity v, and third means configured to determine an output value for the roll angle $\alpha$ by combining the first intermediate value and the second intermediate value.

The apparatus requires the use of two gyroscopes for determining the roll angle, as opposed to one in the prior art, which would seem illogical when trying to provide an inexpensive apparatus. However, by combining the two ways of determining the roll angle, the weakness of each of the two ways can be avoided and the strength of each of the ways can be combined. Thus, two far less precise gyroscopes can be used, and the combined cost on these gyroscopes may significantly undercut the costs of a single high quality gyroscope.

The way of determining the roll angle from the roll rate is a fairly direct measurement, which does not rely on equilibrium of the motorcycle. However, establishing the initial value requires extra information (e.g. direction of gravity at stand still of the bike), and offset of sensor/electronics needs to be low.

The way of determining the roll angle from the yaw rate links the roll angle to yaw angle velocity. So this method is without an initial value problem. However, this method relies on equilibrium of the bike (constant radius). Measurements have shown that at in zigzag course of the motorcycle, this leads to strongly exaggerated estimates of the roll angle, due to disturbance of the equilibrium.

The combination of the two ways results in an apparatus that displays only the advantages of the two ways, without their disadvantages.

Preferably, the third means is configured to use the high frequency part of the first intermediate value and to use the low frequency part of the second intermediate value determined. Thereby, the most useful part of the result of each of the two ways is obtained for use in determining the output value.

The apparatus may further comprise a recursive low-pass digital filter in receipt of a digitized signal from said first sensor, a high-pass digital filter in receipt of a digitized signal from said second sensor; and means for summing the output signal of the low-pass filter with the output signal of the high pass filter. These filter and summation means allow for the two (intermediate) gyro signals to be converted to a single output signal.

Preferably, the low pass filter and/or the high pass filter comprise filter coefficients that are chosen to be powers of two for avoiding round off errors.

The apparatus may further comprise a wheel sensor that provides a signal having plurality of pulses per revolution of the wheel and velocity determining means configured for determining the vehicle velocity from the wheel sensor signal. This signal is available on any conventional motorcycle and forms thereby a ready signal for determining vehicle velocity.

The velocity determining means can be configured to determine the vehicle velocity by measuring the time between the pulses of the signal from the wheel sensor. Time lapse between pulses gives a higher accuracy than counting pulses.

The second means may take account for the reduction in effective radius of the wheel as a function of the roll angle. Thereby, the error that would have been caused by the variation in effective wheel diameter is avoided.

The first- and second gyro sensors can be Micro-Electro-Mechanical Systems. These type of sensors are small, light and relatively inexpensive, which makes them suitable for use in a vehicle that offers little space and has high weight reduction requirements.

The apparatus may further comprise a headlamp servo for adjusting the orientation of the motorcycle headlamp in accordance with the output signal. Thereby, the beam pattern of the headlamp will be kept aligned with the horizon.

The roll rate signal can be fed forward to the headlamp servo. Thereby, the dynamic behavior of the apparatus is improved, without the need for a high bandwidth of the servo system.

Preferably, the first, second and/or third means are implemented as dedicated hardware, as software routines on general hardware or combinations of dedicated hardware and software routines on general purpose hardware. This offers flexibility in selection of components and construction.

The above object is also achieved by providing a software routine on a data carrier, the software routine being configured to determine a first intermediate roll angle α from roll rate signal, determine a second intermediate roll angle α from a yaw rate signal and a vehicle velocity signal, and to determine an output roll angle α by combining the first intermediate roll angle with the second intermediate roll angle.

The software routine may further be configured to combine the high frequency part of the first intermediate roll angle with the low frequency part of the second intermediate roll angle.

The software routine may further be configured to determine the vehicle velocity from the time lapse between pulses from a wheel sensor signal.

The above object is also achieved by providing a method for determining the roll rate of a motorcycle or like vehicle that is subject to roll when taking a curve, the method comprising measuring the roll rate of the vehicle, measuring yaw rate ω of the vehicle, measuring vehicle velocity v, determining a first intermediate value for the roll angle α of the vehicle by integrating the measured roll angle velocity, determining a second intermediate value for the roll angle α of the vehicle from the measured yaw rate ω and the measured vehicle velocity v, and determining an output value for the roll angle α by combining the first intermediate value and the second intermediate value.

In the method, the high frequency part of the intermediate value may be combined with the low frequency part of the intermediate value to obtain said output value.

In the method, the vehicle velocity v is preferably determined by measuring the time lapse between pulses from a wheel sensor signal.

The method may comprise the step of taking account for the reduction in effective radius of the wheel as a function of the roll angle.

Further features, advantages and properties of the apparatus, software routine and method according to the invention will become apparent from the detailed description.

Figure 2:
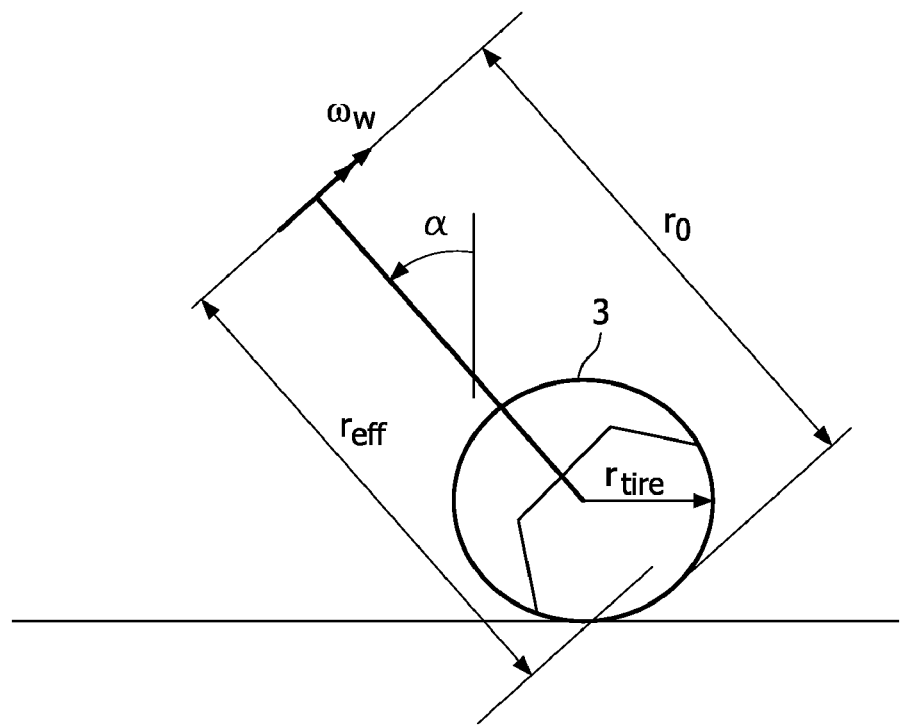
Figure 3:
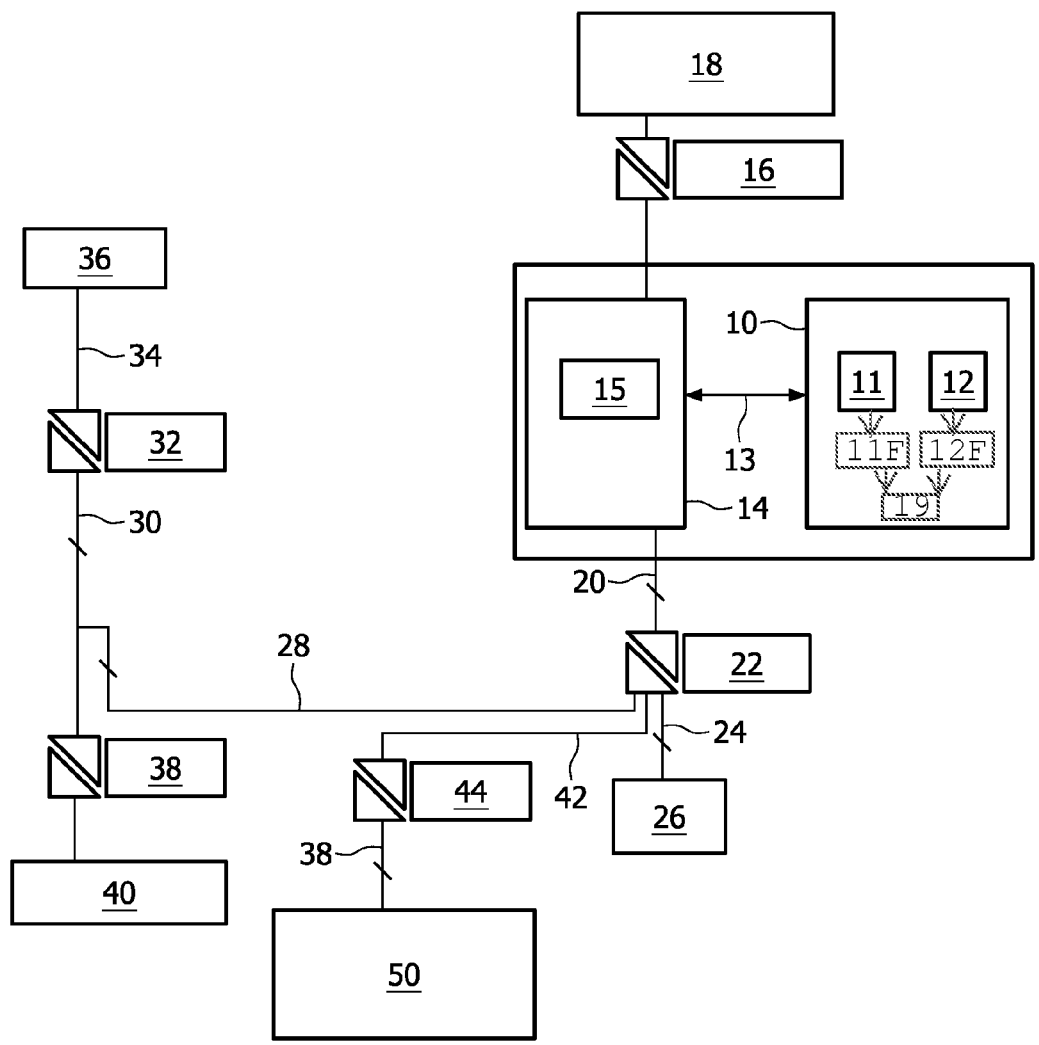

In the following detailed portion of the present description, the invention will be explained in more detail with reference to the exemplary embodiments shown in the drawings, in which:

FIG. 1 is a diagram illustrating the orientation of a motorcycle and the forces acting thereon when taking a curve, FIG. 2 is a diagram illustrating the effect of the roll angle on the effective radius of the wheel, and FIG. 3 is a block diagram illustrating the general architecture of the apparatus according to an embodiment of the invention.

FIG. 1 is diagram showing a motorcycle 1 while taking a curve which results in a roll angle α with the vertical. The body shell 2 of the motorcycle is indicated by the interrupted line. The motorcycle 1 with its driver has a centre of gravity 4 that is disposed at a height h above the underside of the wheel/tire 3. The gravity force acting on the motorcycle is represented by vector mg. The taking of the curve with a radius r results in a yaw rate represented by vector $\omega_y$. The rotational velocity of one of the wheels 3 of the motorcycle is represented by vector $\omega_w$.

According to a preferred embodiment of the invention two methods are used to determine roll angle, namely via the roll rate, and via the yaw rate. The methods are based on the availability of the roll rate and of the yaw rate from respective gyroscopes that are described in greater detail below.

With the first method, a first intermediate value for the roll angle (α) is determined via integration of the signal of a gyro sensor that measures roll angle velocity. The disadvantages of the first method are:

Establishing the initial value requires extra information (e.g. direction of gravity at stand still of the bike),
Offset of sensor/electronics needs to be low, e.g. if a drift of 1 degree per hour is allowed, this implies an offset of less than 1/3600 degrees/sec. Since the highest velocity is about 100 degrees per second, the required dynamic range is 3.6e5 or 110 dB. This sets high demands on the gyro sensor and electronics.

The advantages of the first method are that it is a fairly direct measurement with a potentially high bandwidth, which does not rely on equilibrium of the motorcycle.

With the second method, a second intermediate value for the roll angle (α) is determined via yaw rate ($\omega_y$) under the assumption of equilibrium (v: velocity, g: gravity):

$$\tan\alpha = \frac{v \cdot \omega_y}{g}$$

If the yaw rate with respect to vertical axes of the motorcycle ($\omega_v$) is measured, the relation to roll angle is:

$$\sin\alpha = \frac{v \cdot \omega_v}{g}$$

Velocity is measured via the rotational velocity of the wheel ($\omega_w$). For an accurate velocity measurement, the change in effective radius as a function of roll angle is taken into account. The resulting expression can be approximated accurately by:

$$\alpha = \frac{\omega_w \cdot r_0 \cdot \omega_v}{g},$$

with $r_0$ the radius of the wheel at zero roll angle.

The disadvantages of the second method are that it relies on equilibrium of the motorcycle 1 (constant radius), and a zig-zag course taken by the motorcycle leads to strongly exaggerated estimates of the roll angle (factor of 1.5-2). Further, the second method has a substantial phase lag, which renders it unsuitable for systems with a high bandwidth.

The advantage of the second method is that it links roll angle to yaw angle velocity. So the second method is without an initial value problem.

The first method and the second method are used simultaneously, and the first intermediate value and the second intermediate value for the roll angle α are combined to determine an output value for the roll angle.

The strong points of the first and second method are combined by filtering and combining: the low frequency part of the second intermediate roll angle value/signal obtained with the second method is combined with the high frequency part of the first intermediate roll angle value/signal obtained with the first method:

α=HF(Σroll_gyro)+LF(c·wheel_speed·yaw_gyro)

The second method is based on the equilibrium of the moments with respect to the center of gravity:

$m \cdot g \cdot h \cdot \sin\alpha = m \cdot \omega_y^2 \cdot r \cdot h \cdot \cos\alpha,$ which simplifies to:

$$\tan\alpha = \frac{\omega_y^2 \cdot r}{g}$$

Recognizing that the forward velocity of the bike, v, equals:

$$v = \omega_y \cdot r,$$

the relation becomes:

$$\tan\alpha = \frac{v \cdot \omega_y}{g}$$

A gyro sensor pointing in the upward direction of the bike, gives a signal s which equals:

$$s_y = \omega_y \cdot \cos\alpha$$

Using this sensor information, the roll angle is calculated with:

$$\sin\alpha = \frac{v \cdot s_y}{g}$$

Velocity is measured via the rotational velocity of a wheel, $\omega_w$. The effective radius of the wheel is also a function of roll angle. Ignoring tire distortion, the effect is illustrated in FIG. 2.
So $$v = \omega_w \cdot r_{eff}(\alpha),$$

with $$r_{eff}(\alpha) = r_0 - r_{tyre}(1 - \cos\alpha) = r_0\left(1 - \frac{r_{tire}}{r_0}(1 - \cos\alpha)\right)$$

Substitution gives:

$$\sin\alpha = \frac{\omega_w \cdot r_{eff}(\alpha) \cdot s_y}{g},$$

which can be written as:

$$\frac{\sin\alpha}{1 - \frac{r_{tire}}{r_0}(1 - \cos\alpha)} = \frac{\omega_w \cdot r_0 \cdot s_y}{g}$$

Evaluating the left side of this equation for a 120/60 17 tire (leading to a $r_0$ of 0.312 [m]) and an estimated $r_{tire}$ of 0.1 [m], it becomes clear that the whole expression can be approximated accurately by α itself. Below 50 degrees lean angle, the maximum error is about 1%.

So the following simple expression gives a very good approximation for lean angle:

$$\alpha = c \cdot \omega_w \cdot s_y \text{ [rad]}$$

In theory, $$c = \frac{r_0}{g}$$

In practice, tire distortion is likely to have an influence. Therefore, the system is calibrated by starting with the above indicated theoretical value and then the constant c is tuned downwards until the best accuracy is achieved.

FIG. 3 illustrates a block diagram of the apparatus for determining the roll angle of a motorcycle according to a preferred embodiment of the invention. The apparatus is small enough to be mounted on or in the motorcycle. The apparatus includes a sensor board 10 with two MEMS (Micro-Electro-Mechanical Systems) vibrating gyro sensors 11 and 12. Gyro sensor 11 is pointing in the longitudinal direction of the motorcycle 1 and provides a signal representing the roll rate. Gyro sensor 12 is pointing in the upward direction of the motorcycle 1 and provides a signal representing the yaw rate. The sensor board 10 is connected to a microcontroller 15 on board 14 via a band cable 13. The sensors and the microcontroller 15 may according to a preferred embodiment be placed together on a single printed circuit board (not shown).

FIG. 3 also illustrates a recursive low-pass digital filter 11F for receiving a digitized signal from the gyro sensor 11, a high-pass digital filter 12F for receiving a digitized signal from the gyro sensor 12; and means for summing the output signal of the low-pass filter with the output signal of the high pass filter 19. The filters 11F and 12F and the summation means 19 allows for the two (intermediate) gyro signals to be converted to a single output signal.

Board 14 is connected to via a multiple pin connector 16 to a bus of the other electronic systems 18 of the motorcycle. The other electronic systems 18 may include an ABS system and a Motor Management system.

Board 14 is connected via a 6 wire cable 20 and a 6 pins connector 22 the other components of the apparatus. The connector 22 connects the board 14 to a battery via cable 24. The connector 22 connects the board to a wheel sensor 36 via 1 wire cable 28, connector three pins connector 32 and cable 32 to a wheel sensor 36. The signal of the wheel sensor 36 is routed to the dashboard 40 via cable 30 and three pins connector 38.

The output signal of board 14 is relayed to a servo 50 via cable 20, three pins connector 22, cable 42, connector 44 and cable 38. The servo 50 is operably connected to a head headlamp (not shown) of the motorcycle 1 and rotates the entire headlamp or the light bulb therein (which may be a xenon light bulb) about the lamp axis so as to counter the effect of the roll angle on the orientation of the headlamp/light bulb so that the pattern of the beam of light thrown by the lamp remains substantially leveled with the horizon when the motorcycle rolls when taking a curve.

The wheel sensor 36 provides a multitude (for example 4) of pulses per revolution of the wheel 3. Board 14 measures the time between the pulses: the wheel sensor signal is used to gate a fast clock signal.

Board Includes:
  A 12 bit counter at about 13.5 kHz, for counting the time between pulses from the wheel velocity sensor,
  2 ADCs (8 bit) for the roll and yaw gyros,
  1 PWM output for the servo 50,
  Digital outputs for sample routine, stand still/moving status.

The sample routine software running on the microcontroller 15 is structured to:
  % Read in Sensors:
    Wheel velocity 36 (via counters),
    Roll gyro 11,
    Yaw gyro 12,
  % Perform Calculations:
    Filter and integrate the roll rate signal,
    Calculate wheel velocity,
    Filter the multiplication of wheel velocity with yaw rate signal,
  % Update Value to the Artificial Horizon:
    Determine if velocity is high enough,
    If so, output calculated value to servo 50,
    If not, output a zero value to servo, % Diagnose:
  Put out intermediate and end results of the calculations,
  Put out status,
% Prepare for Next Sample:
  Push through various memory positions.

The interrupt service routine for the wheel counter runs when the edge of a spoke is found and is structured to:
  read out counter content,
  reset the counter, and
  restart the counter.

The counter is equipped with a maximum value. So at (near) standstill, the counter continue sup to that maximum and stops. It may stay at that value for a long time. When eventually a spoke is crossed, the interrupt service routine runs. In the sample routine, the maximum value is then encountered and special action is taken. When motion of the bike continues, the next counter content might be less than maximum, thus signaling a high enough velocity.

If a wheel velocity or vehicle velocity signal is already available from another source on the motorcycle (e.g. over a CAN network), the microcontroller does not need to include a counter for measuring the time between wheel pulses. Instead the already available velocity signal will be used as input signal.

Additionally, the software performs a validity check of sensor signals. If the check fails the roll measurement device goes into a fail safe mode. According to a preferred embodiment the high and low frequency range have an overlapping band to which both gyro sensors contribute. The respective contributions in the overlapping band are compared to check if the values are approximately equal. Hereto, the ratio of the difference in signal/value within the overlapping frequency band and the sum of the two signals is determined and compared with a threshold. If the ratio exceeds the threshold, the roll angle determination device goes into a fail safe mode.

The sample routine includes a digital recursive low pass filter through which the (digitized) signal from the second gyro sensor 12 is passed. The digital filer can be described with the following equation:

$$y(n)=a*y(n-1)+b*x(n)$$

wherein the variable x is the input signal, the variable y is the output signal and the variable n, represents the point that is currently being calculated. The coefficients of the low pass filter a and b are related via the control parameter q with a=1−q and b=q.

Thus the equation can also be written as:

$$y(n)=(1-q)*y(n-1)+q*x(n)$$

For the best performance of the apparatus, the corner frequency of the low pass filter should be placed as low possible, since the signal from the second gyro sensor becomes increasing inaccurate at higher frequencies. At the same time, a high sampling rate is desired in order to obtain a dynamic system.

The combination of these two requirements results in the control parameter q being a very small number. Consequently, the round off error made when multiplications in accordance with the above equation are made can have a considerable effect, thereby deteriorating the system performance. However, there is no exact requirement for the cut off frequency of the low pas filter, and therefore, the control parameter is according to a preferred embodiment chosen to be a power of two. The inherent structure of binary processors allows powers of two to be exactly calculated by so called "shifting", a process that requires very little computation effort and that does not involve any round off error since it is exact.

The signal of the first gyro sensor is passed though a high pass digital filter. The high pass digital filter has the same round off problems associated with the low pass filter. Thus, the control parameter of the high pass filter is also chosen as a power of two.

The filter coefficients of the high pas filter are and the low pass filter are adapted to one another so that the frequency characteristic of the high pass filter and the low pass filter match, i.e. the corner frequency of the high pass filter is equal to the corner frequency of the low pass filter so that so that the sum of the transfer functions is equal to 1.

According to another embodiment, the filters can be implemented in hardwired analogue filters (not shown).

According to another preferred embodiment (not shown), the device comprises a second servo for rotating the headlamp about its vertical axis (vertical as when the motorcycle is upright). Hereto, the apparatus determines the radius of the turn radius from the yaw rate signal received from the second gyro sensor 12 (yaw gyro sensor) and the vehicle velocity in accordance with the equation $$r = \frac{v}{\omega_y}$$

The signals representing the value of the radius of the turn is fed to the second servo which in response adapts the orientation of the headlamp sideways so that the beam of light is directed to the road surface on which the motorcycle will be traveling when following the curve.

The advantages of the apparatus and method according to the invention are:
  a high bandwidth, which enables tracking within a few degrees of the most challenging (zigzag) motion of a motor cycle,
  exhibits no or at least very little drift, so hours of operation do not lead to a building error. Yaw info already available, which may be required in the future,
  roll rate available, which can be used as a feedforward to the motion system of the moveable headlamp, thus boosting its dynamic behavior, without the need for a high bandwidth of that motion system,
  Is robust (it is of the 'closed systems' type, see below) in the sense that it is almost impossible to influence from outside, i.e. independent on its surroundings (day/night, rain, snow, etc),
  can be implemented in simple, cheap hardware, and
  can be packaged in a small box, that can be placed anywhere on the motorcycle.

The term "comprising" as used in the claims does not exclude other elements or steps. The term "a" or "an" as used in the claims does not exclude a plurality.

The reference signs used in the claims shall not be construed as limiting the scope.

Although the present invention has been described in detail for purpose of illustration, it is understood that such detail is solely for that purpose, and variations can be made therein by those skilled in the art without departing from the scope of the invention.

The invention claimed is:

1. An apparatus for determining a roll angle of a motorcycle or a vehicle, said apparatus comprising:
   a first gyro sensor mounted on a sensor board that produces a first signal representing a roll rate of the vehicle,
   a second gyro sensor mounted on the sensor board that produces a second signal representing a yaw rate of the vehicle, and
   the first and second gyro sensors being connected to a microcontroller, the microcontroller being mounted to a circuit board and being programmed to:
     accept the first signal and the second signal, determine a first intermediate value for the roll angle of the vehicle by integrating the roll rate, determine a second intermediate value for the roll angle of the vehicle based on the yaw rate and a vehicle velocity, and the roll angle by combining said first intermediate value and said second intermediate value.

2. The apparatus according to claim 1, wherein said circuit board is configured to use a high frequency part of the first intermediate value and a low frequency part of the second intermediate value for determining the roll angle.

3. The apparatus according to claim 2, wherein the circuit board comprises: a recursive low-pass digital filter for receiving a first digitized signal from said first gyro sensor; a high-pass digital filter for receiving a second digitized signal from said second gyro sensor; and means for summing a first output signal of the low-pass filter with a second output signal of the high pass filter.

4. The apparatus according to claim 3, wherein the low pass filter or the high pass filter comprise filter coefficients that are chosen to be powers of two for avoiding round off errors.

5. The apparatus according to claim 1, wherein the circuit board accounts for a reduction in an effective radius of a wheel as a function of the roll angle.

6. The apparatus according to claim 1, wherein the first gyro sensor and second gyro sensor are Micro-Electro-Mechanical Systems.

7. The apparatus according to claim 1, further comprising a headlamp servo connected to the microcontroller and receiving the first signal for adjusting an orientation of a headlamp or a light bulb in accordance with the roll angle.

8. The apparatus according to claim 7, wherein the first signal representing the roll rate is fed forward to said headlamp servo.

9. The apparatus according to claim 1, wherein said circuit board is implemented as a dedicated hardware, software routines on a general purpose hardware, or combinations of the dedicated hardware and the software routines on the general purpose hardware.

* * * * *